(12) United States Patent
Hara et al.

(10) Patent No.: US 9,542,003 B2
(45) Date of Patent: Jan. 10, 2017

(54) IMAGE PROCESSING DEVICE, IMAGE PROCESSING METHOD, AND A COMPUTER-READABLE NON-TRANSITORY MEDIUM

(71) Applicant: FUJITSU LIMITED, Kawasaki-shi, Kanagawa (JP)

(72) Inventors: Nobuyuki Hara, Meguro (JP); Katsuhito Fujimoto, Kawasaki (JP); Taichi Murase, Kawasaki (JP); Atsunori Moteki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 13/946,546

(22) Filed: Jul. 19, 2013

(65) Prior Publication Data
US 2014/0064557 A1    Mar. 6, 2014

(30) Foreign Application Priority Data
Aug. 31, 2012    (JP) ................................ 2012-191128

(51) Int. Cl.
G06F 3/01    (2006.01)
(52) U.S. Cl.
CPC ............. *G06F 3/017* (2013.01); *G06F 3/012* (2013.01)
(58) Field of Classification Search
None
See application file for complete search history.

(56) References Cited

U.S. PATENT DOCUMENTS

| 5,939,902 A | 8/1999 | Iwata |
| 6,236,736 B1 * | 5/2001 | Crabtree et al. .............. 382/103 |
| 2001/0055063 A1 * | 12/2001 | Nagai et al. .................. 348/116 |

(Continued)

FOREIGN PATENT DOCUMENTS

| JP | 3-111028 | 5/1991 |
| JP | 10-214306 | 8/1998 |

(Continued)

OTHER PUBLICATIONS

Han, Youngjoon, and Hernsoo Hahn. "Visual tracking of a moving target using active contour based SSD algorithm." Robotics and Autonomous Systems 53, No. 3 (2005): 265-281.*

(Continued)

*Primary Examiner* — Vikkram Bali
*Assistant Examiner* — Tracy Mangialaschi
(74) *Attorney, Agent, or Firm* — Staas & Halsey LLP

(57) ABSTRACT

An image processing method includes recognizing a first object that is included in the image data, calculating a positional variation amount of a feature point that corresponds to the first object and is moving in an image center direction so as to calculate a moving speed of the first object on the basis of the positional variation amount, determining whether or not the first object is a gaze target object of the user, in accordance with a behavior of the first object, the behavior being obtained on the basis of the positional variation amount of the first object among the plurality of image data, of which acquisition time is respectively different and whether or not the object continuingly exists in a second region, the second region being positioned in an inside of the first region and including a center point of the image data, for a predetermined period of time.

13 Claims, 10 Drawing Sheets

(56) References Cited

U.S. PATENT DOCUMENTS

| | | |
|---|---|---|
| 2006/0090135 A1 | 4/2006 | Fukuda |
| 2011/0001695 A1 | 1/2011 | Suzuki et al. |
| 2011/0141010 A1* | 6/2011 | Sakata et al. ................. 345/156 |
| 2013/0148849 A1 | 6/2013 | Nakai et al. |

FOREIGN PATENT DOCUMENTS

| | | |
|---|---|---|
| JP | 2004-21931 | 1/2004 |
| JP | 2011-14082 | 1/2011 |
| JP | 2013-120502 | 6/2013 |

OTHER PUBLICATIONS

Gouet, Valerie, and Bruno Lameyre. "SAP: A robust approach to track objects in video streams with snakes and points." In In 15th British Machine Vision Converence. 2004.*

Erdem, Cigdem Eroglu, A. Murat Tekalp, and Bülent Sankur. "Video object tracking with feedback of performance measures." Circuits and Systems for Video Technology, IEEE Transactions on 13, No. 4 (2003): 310-324.*

Dias, Jorge, et al. "Simulating pursuit with machine experiments with robots and artificial vision." Robotics and Automation, IEEE Transactions on 14.1 (1998): 1-18.*

Tsai, Chi-Yi, and Kai-Tai Song. "Dynamic visual tracking control of a mobile robot with image noise and occlusion robustness." Image and Vision Computing 27.8 (2009): 1007-1022.*

\* cited by examiner

FIG. 9

| | | MOVING SPEED OF OBJECT (PIXEL/FRAME) | | | | | | |
|---|---|---|---|---|---|---|---|---|
| | | 0 OR MORE AND LESS THAN 10 | | | 10 OR MORE AND LESS THAN 20 | | | ... |
| MOVING DIRECTION OF OBJECT | | REFERENCE MOTION VECTOR (X', Y') | TOLERANCE RANGE | USER MOTION | REFERENCE MOTION VECTOR (X', Y') | TOLERANCE RANGE | USER MOTION | |
| | LEFT | (10, 0) | (±3, ±3) | TURN HEAD LEFTWARD | (12, 0) | (±3, ±3) | TURN HEAD LEFTWARD | ... |
| | | (−13, 0) | (±5, ±5) | TURN HEAD RIGHTWARD | (−15, 0) | (±5, ±5) | TURN HEAD RIGHTWARD | |
| | | (0, 8) | (±3, ±3) | TURN HEAD UPWARD | (0, 8) | (±3, ±3) | TURN HEAD UPWARD | |
| | | (0, −8) | (±3, ±3) | TURN HEAD DOWNWARD | (0, −8) | (±3, ±3) | TURN HEAD DOWNWARD | |
| | | REFERENCE MOTION VECTOR (X', Y') | TOLERANCE RANGE | USER MOTION | REFERENCE MOTION VECTOR (X', Y') | TOLERANCE RANGE | USER MOTION | |
| | RIGHT | (13, 0) | (±5, ±5) | TURN HEAD LEFTWARD | (15, 0) | (±5, ±5) | TURN HEAD LEFTWARD | ... |
| | | (−10, 0) | (±3, ±3) | TURN HEAD RIGHTWARD | (−12, 0) | (±3, ±3) | TURN HEAD RIGHTWARD | |
| | | (0, 8) | (±3, ±3) | TURN HEAD UPWARD | (0, 8) | (±3, ±3) | TURN HEAD UPWARD | |
| | | (0, −8) | (±3, ±3) | TURN HEAD DOWNWARD | (0, −8) | (±3, ±3) | TURN HEAD DOWNWARD | |
| | | REFERENCE MOTION VECTOR (X', Y') | TOLERANCE RANGE | USER MOTION | REFERENCE MOTION VECTOR (X', Y') | TOLERANCE RANGE | USER MOTION | |
| | UP | (10, 0) | (±3, ±3) | TURN HEAD LEFTWARD | (10, 0) | (±3, ±3) | TURN HEAD LEFTWARD | ... |
| | | (−10, 0) | (±3, ±3) | TURN HEAD RIGHTWARD | (−10, 0) | (±3, ±3) | TURN HEAD RIGHTWARD | |
| | | (0, 8) | (±3, ±3) | TURN HEAD UPWARD | (0, 10) | (±3, ±3) | TURN HEAD UPWARD | |
| | | (0, −10) | (±5, ±5) | TURN HEAD DOWNWARD | (0, −12) | (±5, ±5) | TURN HEAD DOWNWARD | |
| | | REFERENCE MOTION VECTOR (X', Y') | TOLERANCE RANGE | USER MOTION | REFERENCE MOTION VECTOR (X', Y') | TOLERANCE RANGE | USER MOTION | |
| | DOWN | (10, 0) | (±3, ±3) | TURN HEAD LEFTWARD | (10, 0) | (±3, ±3) | TURN HEAD LEFTWARD | ... |
| | | (−10, 0) | (±3, ±3) | TURN HEAD RIGHTWARD | (−10, 0) | (±3, ±3) | TURN HEAD RIGHTWARD | |
| | | (0, 10) | (±5, ±5) | TURN HEAD UPWARD | (0, 12) | (±5, ±5) | TURN HEAD UPWARD | |
| | | (0, −8) | (±3, ±3) | TURN HEAD DOWNWARD | (0, −10) | (±3, ±3) | TURN HEAD DOWNWARD | |

IMAGE PROCESSING DEVICE, IMAGE PROCESSING METHOD, AND A COMPUTER-READABLE NON-TRANSITORY MEDIUM

CROSS-REFERENCE TO RELATED APPLICATION

This application is based upon and claims the benefit of priority of the prior Japanese Patent Application No. 2012-191128, filed on Aug. 31, 2012, the entire contents of which are incorporated herein by reference.

FIELD

The embodiments discussed herein are related to an image processing device, an image processing method, and an image processing program.

BACKGROUND

In recent years, such technique that detailed information of objects existing around a user (referred to below as collateral information) is acquired in a state that the user wears a wearable display such as a head mount display (HMD) on which a camera for acquiring external information is mounted has been developed along with development of information communication technology. Collateral information includes information which does not appear superficially on an object such as information of a specific name of the object, environments in which the object is manufactured, other users' reputation with respect to the object, and the like as well as information which is obtained from an appearance of the object.

Here, when a user selects and acquires information which is desired to acquired, for example, from a plurality of pieces of collateral information, an input system of information from the user has to be prepared. In this case, an interface of related art such as a mouse and a keyboard may be used, but a method in which a motion (gesture) of a user is used as an input system has attracted attention as a simple and effective input method.

As methods in which a gesture of a user is used as an input system, a method in which a finger motion is measured with an acceleration sensor and a method in which movement of a visual line is measured with a visual line detection device which is mounted on a wearable device have been disclosed (for example, Japanese Laid-open Patent Publication No. 10-214306).

Further, to realize a hands-free or eyes-free user interface using gestures, such method that movement of a head (including a jaw) is recognized as a gesture has attracted attention, as well. Regarding a recognition method by a motion of a head, it is possible to realize natural gesture input which is related to actual daily performance of a human such as nodding and head shaking.

As a method in which a motion of a head is used as an input system, a method in which a position of a head is estimated by an externally-disposed sensor so as to determine a motion of the head has been disclosed. Further, a method in which an acceleration sensor is attached on a head of a user and a value obtained from the acceleration sensor is analyzed so as to determine a motion of the head has been disclosed (for example, Japanese Laid-open Patent Publication No. 2011-14082).

SUMMARY

According to an aspect of the invention, an image processing device includes an acquisition unit configured to acquire a plurality of image data, of which acquisition time is respectively different, in a sight direction of a user, a storage unit configured to store data related to a feature point of an object, an object recognition unit that extracts data corresponding to the feature point of the object from a first region in the image data and associates the data that is extracted with the data related to the feature point of the object, the data related to the feature point being stored in the storage unit, so as to recognize a first object that is included in the image data, a movement estimation unit that calculates a positional variation amount of the data related to the feature point, the data corresponding to the first object and being moving in an image center direction, on the basis of the plurality of image data and calculates a moving speed of the first object on the basis of the positional variation amount, a gaze determination unit that determines whether or not the first object is a gaze target object of the user, in accordance with a behavior of the first object, the behavior being obtained on the basis of the positional variation amount of the first object among the plurality of image data, and whether or not the object continuingly exists in a second region, the second region being positioned in an inside of the first region and including a center point of the image data, for a predetermined period of time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 illustrates examples of user motion association tables;

DESCRIPTION OF EMBODIMENTS

Figure 1:
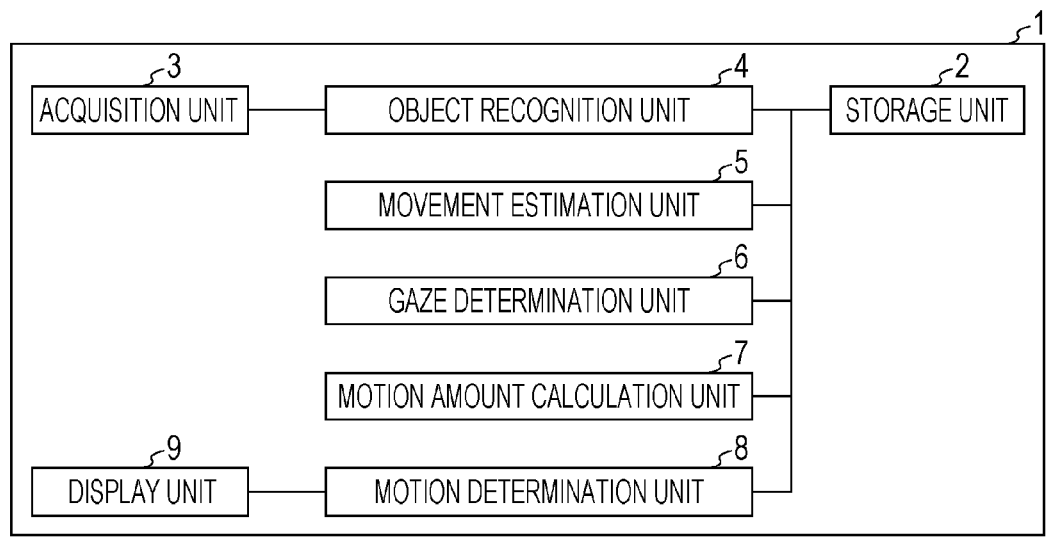
FIG. 1 is a functional block diagram illustrating a functional configuration example of an image processing device according to embodiment 1.

An image processing device, an image processing method, and an image processing program according to embodiments of the present disclosure will be described in detail below with reference to the accompanying drawings. Here, the embodiments do not limit the technique of the present disclosure.

By the way, regarding a case where a user makes a motion with respect to an object, both of a case where the user makes a motion with respect to a still object (a signboard, for example) and a case where the user makes a motion with respect to a moving object (an advertisement drawn on a running truck, for example) are conceivable. Between these cases, an image processing device and an image processing method for recognizing a motion of a user with respect to a still object have been proposed in an earlier application (Japanese Patent Application No. 2011-268378) by the inventor of this application.

In the earlier application (Japanese Patent Application No. 2011-268378), when a user gazes at a still object, a motion vector of the object at which the user gazes is acquired from an image in which a direction of a visual line of the user is imaged, so as to detect a motion of the user. However, an object of which information is desired to be acquired by a user is not necessarily a still object. A case where a user desires to acquire information about a product advertisement which is drawn on a running truck, for example, is derivable. Therefore, in the specification of the present disclosure, a case where a motion of a user is detected when the user gazes at a moving object is described.

According to verification of the inventor, when a user recognizes a moving object, the user first turns the user's head in a direction, in which the object exists, to bring the object into the user's sight, then rotates only eyeballs while fixing the head to follow the target object, and makes a motion to continue the follow-up until the object becomes to be positioned near the center of the sight. Then, after the object reaches in the vicinity of the center of the sight, the user stops the rotation of the eyeballs and follows the object by turning of the user's neck. Such tendency has been turned out.

Further, according to verification of the inventor, when a user follows a moving target object by turning the user's neck in a case in which a positional relation between the user and the target object changes, positions of the object in image data of respective frames are almost same as each other. However, it has been turned out that when the user moves the user's head in parallel with a moving direction of the target object in this state, motion time of the head changes in accordance with a moving speed of the target object which is followed and the motion time of the head tends to be shorter as the moving speed of the target object which is followed is higher.

Here, a reason why motion time of a head becomes shorter (motion speed becomes higher) in accordance with a moving speed of an object is described with reference to the following concrete example. Such case is considered that a user makes a gesture to turn the user's head in a left direction while the user follows an object, which horizontally moves toward the left direction from the view of the user with a fixed speed, by turning the user's head in the left direction. Here, a motion in which a motion of the head is started and stopped once (turns to the full extent) is referred to as an "outward way", and a motion in which the head is returned to the position of the motion start time after the stop is referred to as a "return way".

Regarding the outward way, since the user has started to turn the user's head in the direction same as the outward way direction before start of a gesture, a turning speed of the head becomes higher such that the turning speed of the head which is accorded with a moving speed of the object is added to a speed of an outward way motion, as the moving speed of the object is higher. Accordingly, motion time of the outward way is decreased (the motion speed is increased) as the moving speed of the object is higher. Further, a moving direction of the object is opposite to the turning direction of the head in the return way, so that the turning speed in the return way direction and the speed in the moving direction of the recognition target object are added to each other, shortening the motion time in the return way.

Subsequently, a case where a user makes a gesture to turn the user's head in a right direction while the user follows an object which horizontally moves in the left direction from the view of the user with a fixed speed, as is the case with the above-described example, by turning the user's head in the left direction is considered.

First, the turning direction of the head in the outward way is opposite to the turning direction in the follow-up motion and thus the user turns the user's head in a direction in which the object goes away from a center of the sight. Therefore, the turning speed of the head is obtained by adding the moving speed of the object and the turning speed of the head to each other. Accordingly, the user feels that the user turns the head more largely than the real turning. Further, when the turning direction of the head of the user and the moving direction of the object are different from each other, a turning angle of the head is decreased and consequently, the motion time becomes shorter. Though the moving direction of the object and the turning direction of the head are same as each other in the return way, the head has to be quickly turned to follow up the object which moves in the left direction because the object has been in a direction in which the object goes away from a center of the sight in the left direction in the motion of the outward way and therefore the moving speed of the object is added to the turning speed of the head in the return way direction. Accordingly, the turning speed of the head is increased (the motion time in the return way becomes shorter, as well) as a result.

Here, it is assumed that a moving direction of a head of a user is parallel with a moving direction of a target object, unless a comment is specifically provided, in the following description. When the moving direction of the head of the user is orthogonal to the moving direction of the target object, the method described in the above-mentioned earlier application (Japanese Patent Application No. 2011-268378) is directly applicable.

Embodiment 1

FIG. 1 is a block diagram illustrating a functional configuration example of an image processing device 1 according to embodiment 1. In FIG. 1, the image processing device 1 includes a storage unit 2, an acquisition unit 3, an object recognition unit 4, a movement estimation unit 5, a gaze determination unit 6, a motion amount calculation unit 7, a motion determination unit 8, and a display unit 9.

The storage unit 2 has a function to store a feature point of an object. The feature point is extracted from an image which is obtained by imaging an object (a signboard, a commercial product, a tree, and the like) which is a target of recognition processing performed by the image processing device 1. Further, the storage unit 2 has a function to store collateral information about the object and a motion, which corresponds to the collateral information, of a user. Furthermore, the storage unit 2 has a function to hold a user motion association table, in which a motion vector of a recognition target object of the user is associated with a motion of the user, while associating the user operation association table with a moving direction and a moving speed of the object.

Figure 12:
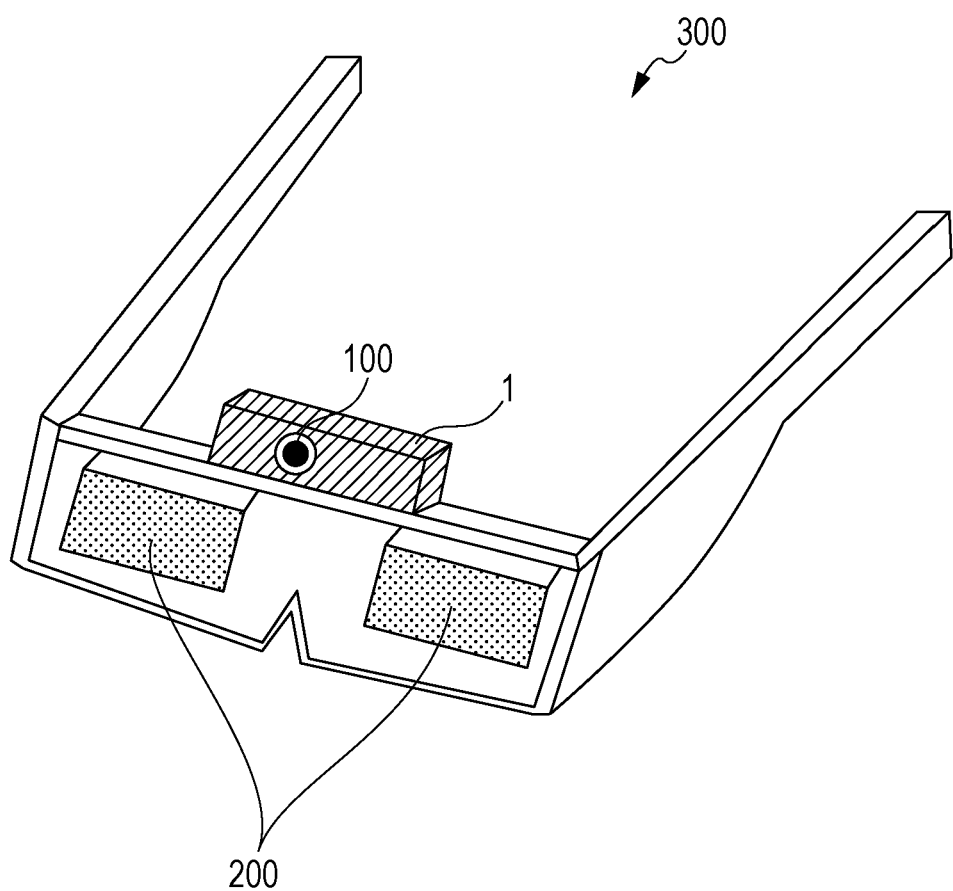
FIG. 12 is a configuration diagram illustrating a HMD which includes the image processing device according to an embodiment.

The acquisition unit 3 has a function to acquire image data which is imaged by an imaging device 100 (depicted in FIG. 12). Specifically, the acquisition unit 3 acquires image data, which is imaged by the imaging device 100 which is mounted on a HMD, for example, in a sight direction of a user.

The object recognition unit 4 has a function to extract a feature point from a peripheral part of image data which is acquired by the acquisition unit 3 and associate the extracted feature point with a feature point, which is stored in the storage unit 2, of an object so as to recognize one or more objects which are included in the image data which is acquired by the acquisition unit 3. Here, a detailed flow of the recognition processing of an object which is executed by the object recognition unit 4 will be described later.

The movement estimation unit 5 has a function to calculate a motion vector of a feature point of one or more recognition target objects which are recognized by the object recognition unit 4 from a plurality of image data and estimate a moving speed and a moving direction of the object with respect to the user. As described above, there is such tendency that when a user recognizes a moving object, the user first turns the user's head in a direction in which the object exists to bring the object into the user's sight, then rotates only eyeballs while fixing the head to follow the target object, and makes a motion to continue the follow-up until the object becomes to be positioned near the center of the sight. Accordingly, position change of the recognition target object in the sight in a state that the head of the user is fixed is calculated, being able to estimate a moving speed of the recognition target object with respect to the user. Here, a detailed flow of the estimation processing of a moving speed and a moving direction of an object, which is executed by the movement estimation unit 15, will be described later.

The gaze determination unit 6 has a function to determine whether or not the object is a gaze target of a user, on the basis of a direction and a size of a motion vector of the object and a property of whether or not the object is positioned in a predetermined range for a certain period of time, for example. Here, a detailed flow of the determination processing of the gaze target which is performed by the gaze determination unit 6 will be described later.

The motion amount calculation unit 7 has a function to calculate a motion vector of a feature point of an object which is recognized by the object recognition unit 4 and is determined as a gaze target of a user by the gaze determination unit 6. Here, a detailed flow of the motion amount calculation processing of an object which is performed by the motion amount calculation unit 7 will be described later.

The motion determination unit 8 has a function to determine a motion of a user on the basis of a motion vector, which is calculated by the movement estimation unit 5, of an object (first vector) and a motion vector, which is calculated by the motion amount calculation unit 7, of the object (second vector). Specifically, the motion determination unit 8 selects a user motion association table which is stored in the storage unit 2 on the basis of a motion vector, which is calculated by the movement estimation unit 5, of an object and determines a motion of the user on the basis of the table.

Here, a detailed flow of the user motion determination which is performed by the motion determination unit 8 will be described later.

The display unit 9 has a function to acquire collateral information, which corresponds to a motion of a user which is determined by the motion determination unit 8, of a recognition target object from the storage unit 2 and output the collateral information to a display device 200 (depicted in FIG. 12). In the display device 200, collateral information of a recognition target object is displayed in a manner to be superposed on the recognition target object.

Figure 2:
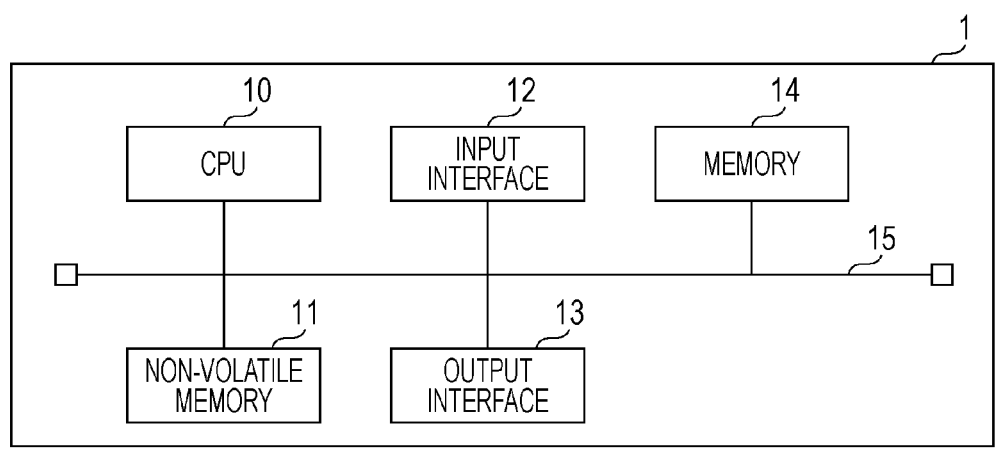
FIG. 2 is a block diagram illustrating a hardware configuration example of the image processing device according to embodiment 1.

FIG. 2 is a block diagram illustrating a hardware configuration example of the image processing device 1 according to embodiment 1. In FIG. 2, the image processing device 1 includes a central processing unit (CPU) 10, a non-volatile memory 11, an input interface 12, an output interface 13, and a memory 14. Further, respective elements are electrically connected with each other via a bus 15.

Here, the CPU 10 is an arithmetic unit which controls the whole of the image processing device 1. The non-volatile memory 11 is a semiconductor memory element such as a flash memory, or a storage device such as a hard disc drive (HDD), a read only memory (ROM), and an optical disc. In the non-volatile memory 11, a program for making the image processing device 1 operate, data used for operating the program, feature points of a plurality of recognition target objects, collateral information about the recognition target objects, and motions of a user which correspond to the collateral information are stored. The input interface 12 is an interface which connects the imaging device 100 and the bus 15 to each other, and the output interface 13 is an interface which connects the display device 200 and the bus 15 to each other. The memory 14 is a storage device such as a register and a random access memory (RAM) and is used as a work area of the CPU 10.

In the image processing device 1, concretely, the function of the acquisition unit 3 is realized by the input interface 12, and the function of the display unit 9 is realized by the output interface 13, for example. Further, in the image processing device 1, the function of the storage unit 2 is realized by the non-volatile memory 11, for example. Furthermore, in the image processing device 1, the CPU 10 executes the program which is stored in the non-volatile memory 11, for example, realizing the functions of the object recognition unit 4, the movement estimation unit 5, the gaze determination unit 6, the motion amount calculation unit 7, and the motion determination unit 8.

[Processing Flow of Object Recognition Unit 4]

Figure 3:
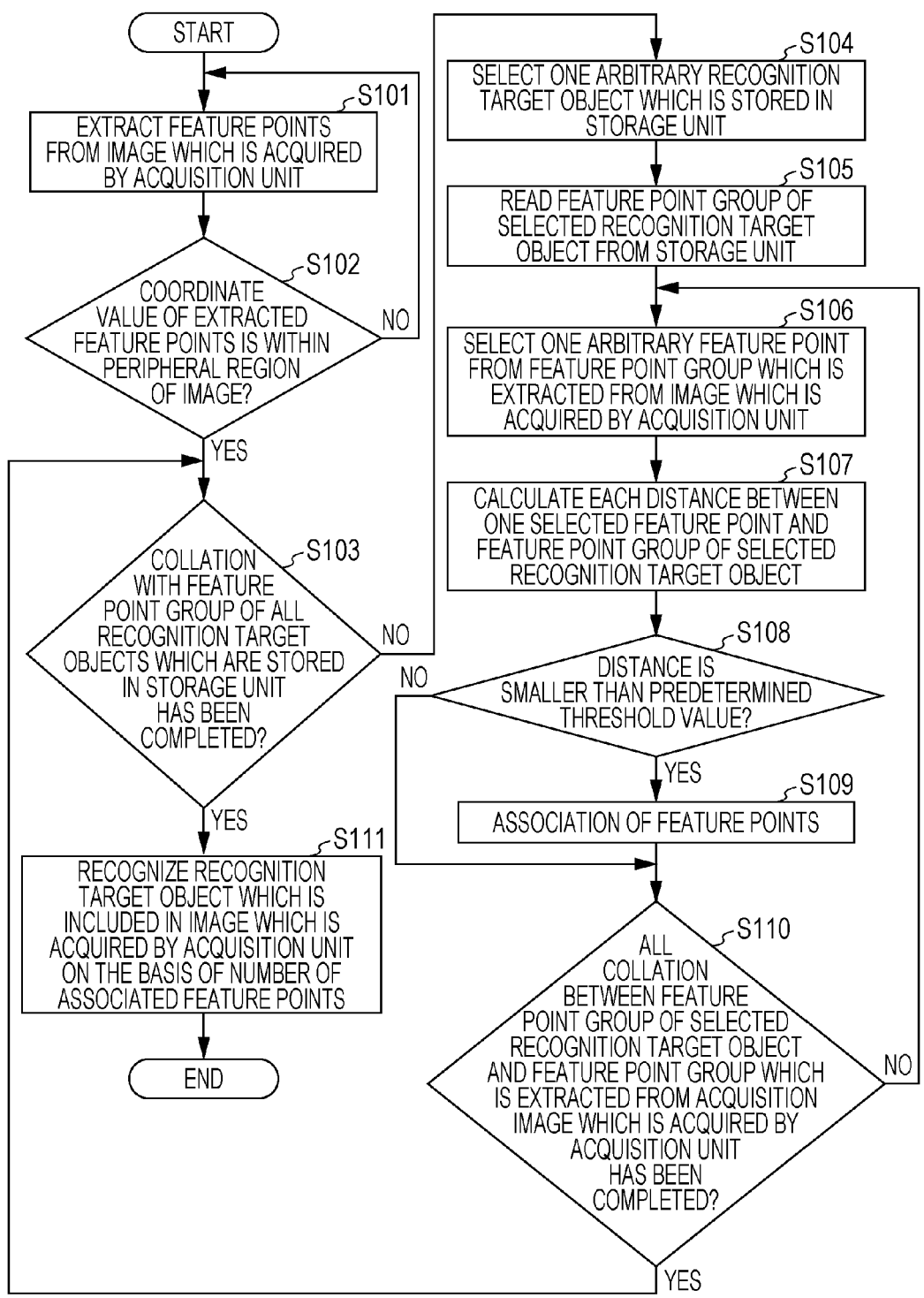
FIG. 3 is a flowchart of object recognition processing which is performed by an object recognition unit.

FIG. 3 is a flowchart illustrating the object recognition processing which is performed by the object recognition unit 4 according to embodiment 1. The object recognition unit 4 first acquires image data (frame) from the acquisition unit 3 so as to extract feature points from the image data (frame) (step S101). Here, it is to be noted that a plurality of feature points are commonly extracted from image data (frame) in embodiments of this disclosure.

Subsequently, the object recognition unit 4 determines whether the feature points which are extracted by the object recognition unit 4 in step S101 are positioned within a predetermined peripheral region in the acquired image data (step S102). Specifically, the object recognition unit 4 determines whether a coordinate value representing the feature points (for example, a median point of the feature points) is positioned within the above-mentioned predetermined peripheral region. Here, a case where peripheral regions of image data are one-fifth regions from both ends of the image is described in this specification.

Figure 4:
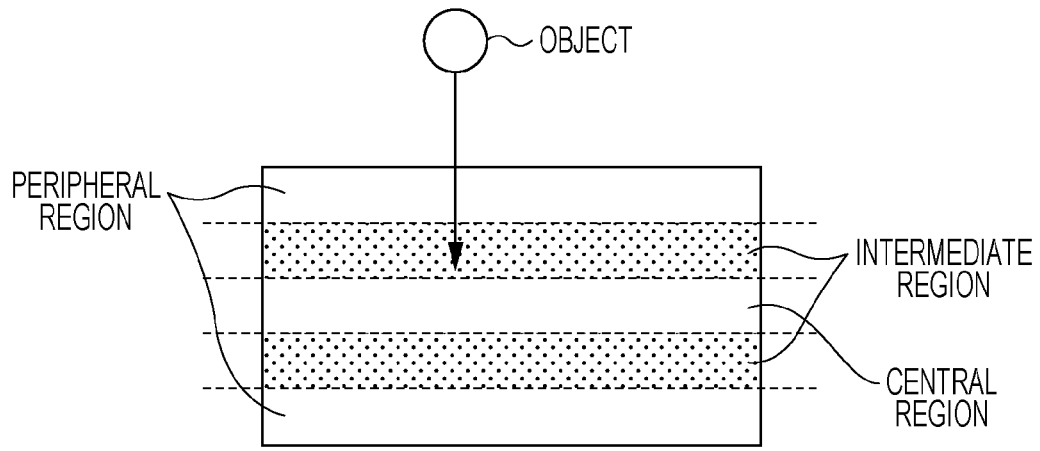
FIG. 4 illustrates an example of a peripheral part of image data.

FIG. 4 illustrates an example of a peripheral part of image data according to embodiment 1. As depicted in FIG. 4, one-fifth parts from the upper and lower ends of the image are set as peripheral parts when an object is moving vertically, and one-fifth parts from the right and left ends of the image are set as peripheral parts when an object is moving horizontally. Here, a setting method of a peripheral part is not limited to the above-described method. An administrator or the like may arbitrarily set a peripheral part such that one-fifth regions from edges of an image are set as peripheral parts irrespective of a moving direction of an object, for example.

When the feature points are not positioned in the predetermined region of an image peripheral part (step S102: No), the object recognition unit 4 returns to the processing of step S101. When the coordinate value is within the predetermined region of the image peripheral part (step S102: Yes), the object recognition unit 4 goes to next processing.

Then, the object recognition unit 4 determines whether or not collation between respective feature points among a plurality of feature points which are extracted by the object recognition unit 4 in step S101 and respective feature points among a plurality of feature points of all objects which are stored in the storage unit 2 has been completed (step S103). When the collation has not been completed (step S103: No), the object recognition unit 4 selects one arbitrary object which is stored in the storage unit 2 (step S104).

Subsequently, the object recognition unit 4 reads the feature points of the object which is selected by the object recognition unit 4 in step S104, from the storage unit 2 (step S105). Further, the object recognition unit 4 selects one arbitrary feature point from the feature points which are extracted by the object recognition unit 4 in step S101 (step S106).

The object recognition unit 4 searches association between one feature point which is selected by the object recognition unit 4 in step S106 and the feature points of the object which are read by the object recognition unit 4 in step S105 (step S107). Specifically, the object recognition unit 4 calculates a distance d as a degree of similarity between one feature point which is selected by the object recognition unit 4 in step S106 and each of the feature points of the object which are read by the object recognition unit 4 in step S105.

Then, the object recognition unit 4 performs threshold value determination to determine validity of the association of feature points (step S108). Specifically, a minimum value d1 of the distance d which is calculated by the object recognition unit 4 in step S107 and a second minimum value d2 are calculated. Then, the object recognition unit 4 determines whether or not a distance between d1 and d2 is equal to or larger than a predetermined distance (for example, d1 has a value which is smaller than a value which is obtained by multiplying d2 by 0.6) and d1 is equal to or smaller than a predetermined value (for example, 0.3 or less), as threshold value determination. Here, a threshold value is not limited to the above-mentioned threshold value, but may be arbitrarily set by a system administrator or the like.

When the condition of the threshold value determination is satisfied (step S108: Yes), the object recognition unit 4 performs association of feature points (step S109). When the condition is not satisfied (step S108: No), the object recognition unit 4 goes to the next processing without performing the association of feature points.

Subsequently, the object recognition unit 4 determines whether all collation between the feature points which are read by the object recognition unit 4 in step S105 and the feature points which are acquired by the acquisition unit 3 in step S101 has been completed (step S110). When the collation processing has been completed (step S110: Yes), the object recognition unit 4 progresses the processing to step S103. When the collation processing has not been completed (step S110: No), the object recognition unit 4 progresses the processing to step S106.

When it is determined that all collation has been completed in step S103 (step S103: Yes), the object recognition unit 4 recognizes one or more objects which are included in the image which is acquired by the acquisition unit 3, on the basis of the number of feature points which are associated by the object recognition unit 4 in step S109 (step S111).

Thus, the object recognition unit 4 recognizes one or more recognition target objects which are included in image data, from the image data which is acquired by the acquisition unit 3. Further, the object recognition unit 4 may perform the above-described recognition processing for all of a plurality of image data which are acquired by the acquisition unit 3. Furthermore, the object recognition unit 4 may set a key frame for every predetermined period of time and perform recognition processing only in the key frame.

[Processing Flow of Movement Estimation Unit 5]

Figure 5:
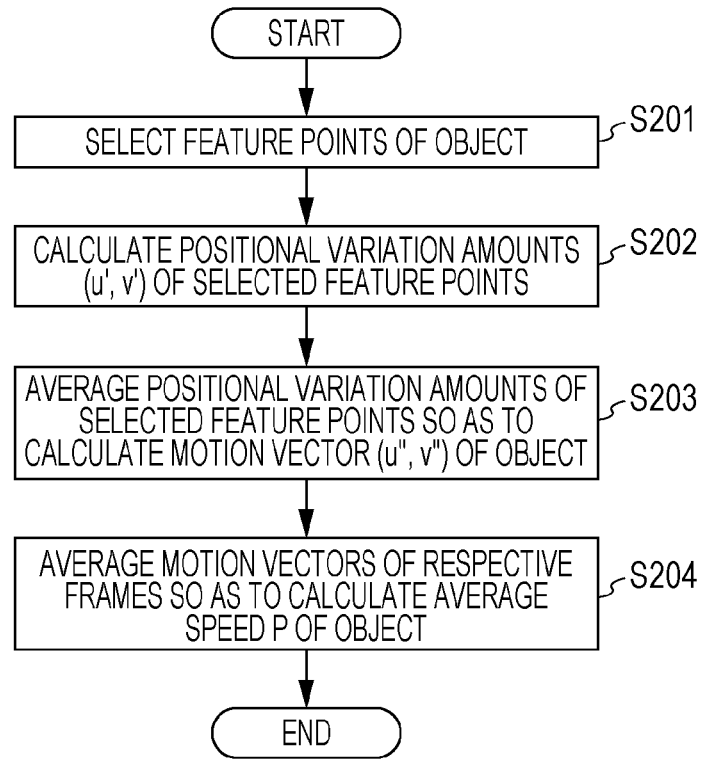
FIG. 5 is a flowchart of estimation processing of a moving speed and a moving direction of an object which is performed by a movement estimation unit.

FIG. 5 is a flowchart illustrating the estimation processing of a moving speed and a moving direction of an object, which is performed by the movement estimation unit 5. The movement estimation unit 5 first selects a plurality of feature points which are to be used for estimation processing, among feature points of the object which is recognized by the object recognition unit 4 (step S201). Here, it is sufficient that the number of feature points which are used for estimation processing is plural (for example, 4 pieces), and a system administrator or the like may arbitrarily set selection references and the number of feature points in view of accuracy of estimation processing and load of processing.

Then, the movement estimation unit 5 calculates positional variation amounts (u',v') of respective feature points which are selected by the movement estimation unit 5 in step S201 in a time series manner by using an optical flow, for example (step S202). Here, the movement estimation unit 5 may set an upper limit of a positional variation amount as appropriate and determine validity of a positional variation amount, in order to enhance robustness of the processing in step S202. A head of a human moves for approximately one second as described above, so that an object which exists in a sight of a user for one second or longer may be assumed to be able to be tracked and it may be determined that a positional variation amount is valid when the positional variation amount per frame is equal to or less than "the total number of pixels in a moving direction of an object/the number of frames per second", for example. However, this is merely an example and does not limit embodiments of the present disclosure.

Subsequently, the movement estimation unit 5 averages positional variation amounts of a plurality of feature points which are to be used for movement estimation, among the feature points which are calculated by the movement estimation unit 5 in step S202, so as to calculate a motion vector (u",v") on the basis of the average value (step S203). Here, the data configuration of a motion vector is specifically described. For example, when a frame which is acquired at current time t is defined as a frame t and a moving amount of a feature point between current time t and time t−1 is defined as a motion vector, (x,y) of a motion vector of the frame t is expressed as (9.3,−3.4), (x,y) of a motion vector of the frame t−1 of past time is expressed as (9.9,−2.8), and (x,y) of a motion vector of a frame t−2 of past time is expressed as (8.1,−1.3).

Then, the movement estimation unit 5 averages motion vectors of respective frames in movement of the object toward a center of image data in a peripheral region in the image data, by the number of frames so as to calculate an average speed P of the object (step S204). Specifically, the movement estimation unit 5 calculates a size of a vector which is obtained by dividing a sum of the motion vectors of respective frames in movement of the object toward the center of image data in the peripheral region in the image data, by the number of frames, as an average speed P (pixel/frame) of the object. Thus, the movement estimation unit 5 calculates positional variation amounts of feature points of an object on the basis of a plurality of image data and calculates an average speed of the object on the basis of the positional variation amounts. Here, the movement estimation unit 5 may set a length of a vector which is obtained by dividing a sum of motion vectors of respective frames by the number of frames, as an average speed P or may set only an x element of the vector or a y element as an average speed P.

[Processing Flow of Gaze Determination Unit 6]

Figure 6:
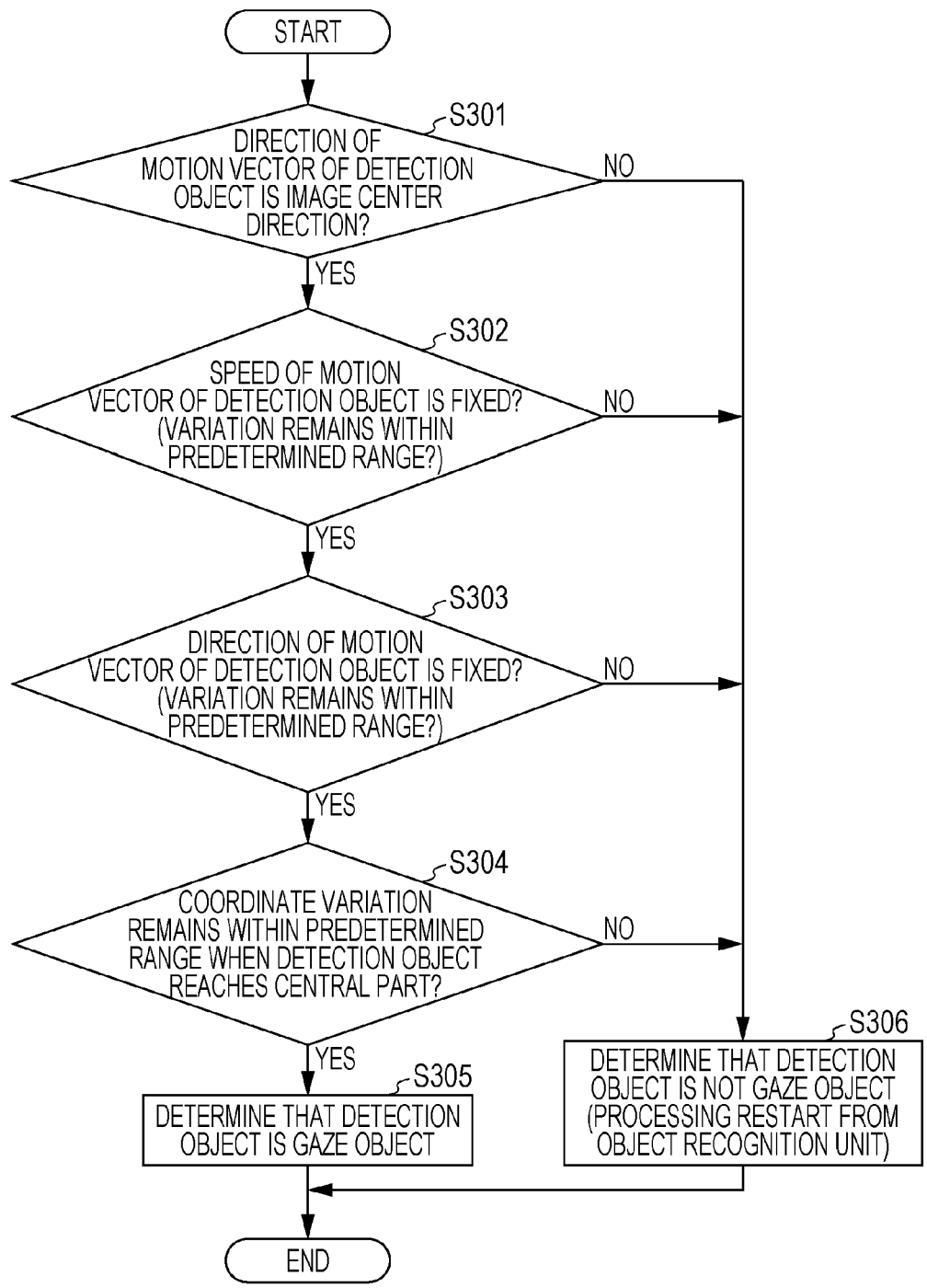
FIG. 6 is a flowchart of determination processing of a gaze target which is performed by a gaze determination unit.

FIG. 6 is a flowchart illustrating the determination processing of a gaze target which is performed by the gaze determination unit 6. The gaze determination unit 6 first determines whether a direction of a motion vector, which is calculated by the movement estimation unit 5, of an object which is moving in the peripheral region and an intermediate region of the image data is toward an image center direction (step S301). Specifically, the gaze determination unit 6 determines that a direction of a motion vector is toward an image center direction in the frame t when a position of the object in the frame t is closer to the center of an image than the position of the object in the frame t−1. Here, a case where intermediate regions of image data are set to be regions from one-fifth to two-fifth from both ends of the image is described, in this embodiment.

FIG. 4 illustrates an example of an intermediate part of image data according to this embodiment, as well. As depicted in FIG. 4, regions from one-fifth to two-fifth from the upper and lower ends of the image are set as intermediate parts when an object is moving vertically, and regions from one-fifth to two-fifth from the right and left ends of the image are set as intermediate parts when an object is moving horizontally. Here, a setting method of an intermediate part is not limited to the above-described method. An administrator or the like may arbitrarily set an intermediate part such that regions from one-fifth to two-fifth from edges of an image are set as intermediate parts irrespective of a moving direction of an object, for example.

When the direction of the motion vector of the object which is calculated by the movement estimation unit 5 is not toward the image center direction (step S301: No), the gaze determination unit 6 determines that the object is not a gaze target of a user (step S306) and the processing returns to the object recognition processing performed by the object recognition unit 4. However, this determination method is an example and does not limit embodiments of the present disclosure.

When the direction of the motion vector of the object which is calculated by the movement estimation unit 5 is toward the image center direction (step S301: Yes), the gaze determination unit 6 determines whether a size of a motion vector of the object which is moving in a peripheral region and an intermediate region in the image data (that is, a speed of the object) is fixed (step S302). Specifically, if variation of a size of a motion vector of the object is within a predetermined rate (for example, ±5%) in the predetermined number of frames (for example, 10 frames) when the object is moving in the peripheral region and the intermediate region in the image data, the gaze determination unit 6 determines that a speed of the object is fixed. However, this determination method and the concrete value are examples and do not limit embodiments of the present disclosure. When variation of the size of the motion vector of the object is not fixed (step S302: No), the gaze determination unit 6 determines that the object is not a gaze target of the user (step S306) and the processing returns to the object recognition processing performed by the object recognition unit 4.

When a size of a motion vector of an object which is moving in the peripheral region and the intermediate region in the image data is within a predetermined range (step S302: Yes), the gaze determination unit 6 determines whether the direction of the motion vector of the object is fixed (step S303). Specifically, when an angle of a motion vector of an object which is moving in the peripheral region and the intermediate region in the image data does not vary over a predetermined range (for example, ±16° in the predetermined number of frames (for example, 10 frames), the gaze determination unit 6 determines that a direction of the motion vector of the object is fixed. However, this determination method and the concrete value are examples and do not limit embodiments of the present disclosure. When the direction of the motion vector of the object is not fixed (step S303: No), the gaze determination unit 6 determines that the object is not a gaze target of the user (step S306) and the processing returns to the object recognition processing performed by the object recognition unit 4.

When the direction of the motion vector of the object which is moving in the peripheral region and the intermediate region in the image data is within the predetermined range (step S303: Yes), the gaze determination unit 6 determines whether the object remains on a position in a central region after the object reaches the central region of the image (step S304). Specifically, when a coordinate of the object remains in a central region for the predetermined number of frames (for example, 10 frames) continuingly after the coordinate of the object enters the central region, the gaze determination unit 6 determines that the object remains on the position in the central part after the object reaches the central part. When the coordinate of the object does not remain in the region continuingly (step S304: No), the gaze determination unit 6 determines that the object is not a gaze target of the user (step S306) and the processing returns to the object recognition processing performed by the object recognition unit 4.

When the coordinate of the object remains in the region (step S304: Yes), the gaze determination unit 6 determines that the object is a gaze target of the user (step S305). Here, when it is determined that a plurality of objects are gaze targets through the above-described processing, the gaze determination unit 6 may select an object of which a coordinate value is closest to the center of the image as a gaze target or may select an object of a gaze target in accordance with selection by the user. Thus, the gaze determination unit 6 determines an object which is a gaze target of a user, by using a direction and a size of a motion vector of the object. Here, the determination processing of a gaze target which is performed by the gaze determination unit 6 may be performed in parallel with the estimation processing of a moving speed and a moving direction of an object which is performed by the movement estimation unit 5 or may be performed after the estimation processing.

[Processing Flow of Motion Amount Calculation Unit 7]

Figure 7:
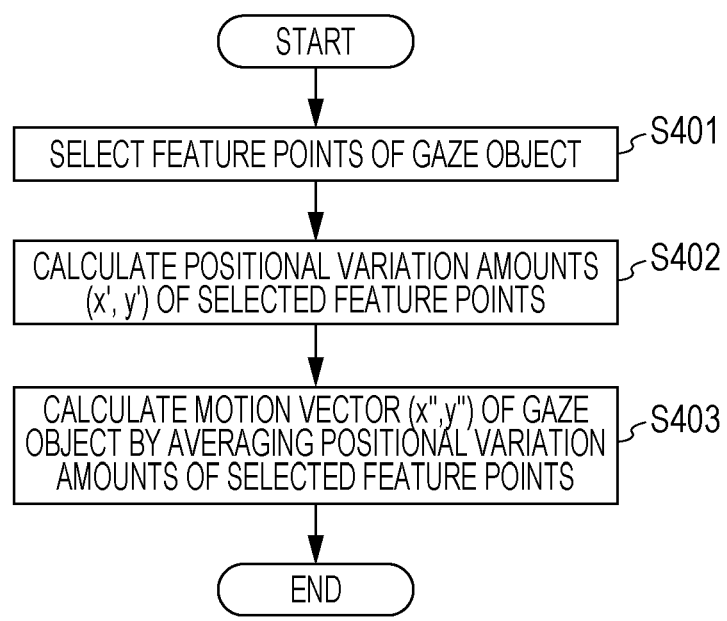
FIG. 7 is a flowchart of calculation processing of a motion amount of an object which is performed by a motion amount calculation unit.

FIG. 7 is a flowchart illustrating the calculation processing of a motion amount of an object which is performed by the motion amount calculation unit 7. The motion amount calculation unit 7 first selects a plurality of feature points which are used for motion amount calculation, among feature points of an object which is determined as a gaze target of a user by the gaze determination unit 6 (referred to below as a gaze target object) (step S401). Here, it is sufficient that feature points which are used for motion amount calculation processing is plural and a system administrator or the like may arbitrarily set selection references and the number of feature points.

Then, the motion amount calculation unit 7 calculates variation amounts (x',y') of motion vectors of respective feature points which are selected by the motion amount calculation unit 7 in step S401, in a time series manner by using an optical flow, for example (step S402). Here, the motion amount calculation unit 7 may set an upper limit of a positional variation amount as appropriate and determine validity of a positional variation amount, in order to enhance robustness of the processing in step S402. As a method for determining validity of the positional variation amount, such a method is conceivable that a positional variation amount is determined as valid when the positional variation amount per frame is equal to or less than "the total number of pixels in a moving direction of an object/the number of frames per second", for example, on the basis of the above-mentioned reason. However, this is merely an example and does not limit embodiments of the present disclosure.

Subsequently, the motion amount calculation unit 7 averages the positional variation amounts of respective feature points which are calculated by the motion amount calculation unit 7 in step S402 so as to calculate a motion vector (x'',y'') of a gaze target object on the basis of the value (step S403). The motion amount calculation unit 7 may set a combination of motion vectors of the x direction and the y direction as a motion vector of a gaze target object or may set a motion vector in which only the x direction or the y direction is focused, as a motion vector of the gaze target object. Thus, the motion amount calculation unit 7 calculates positional variation amounts of feature points of a gaze target object on the basis of a plurality of image data so as to calculate a motion vector of the gaze target object on the basis of the positional variation amounts.

[Processing Flow of Motion Determination Unit 8]

Figure 8:
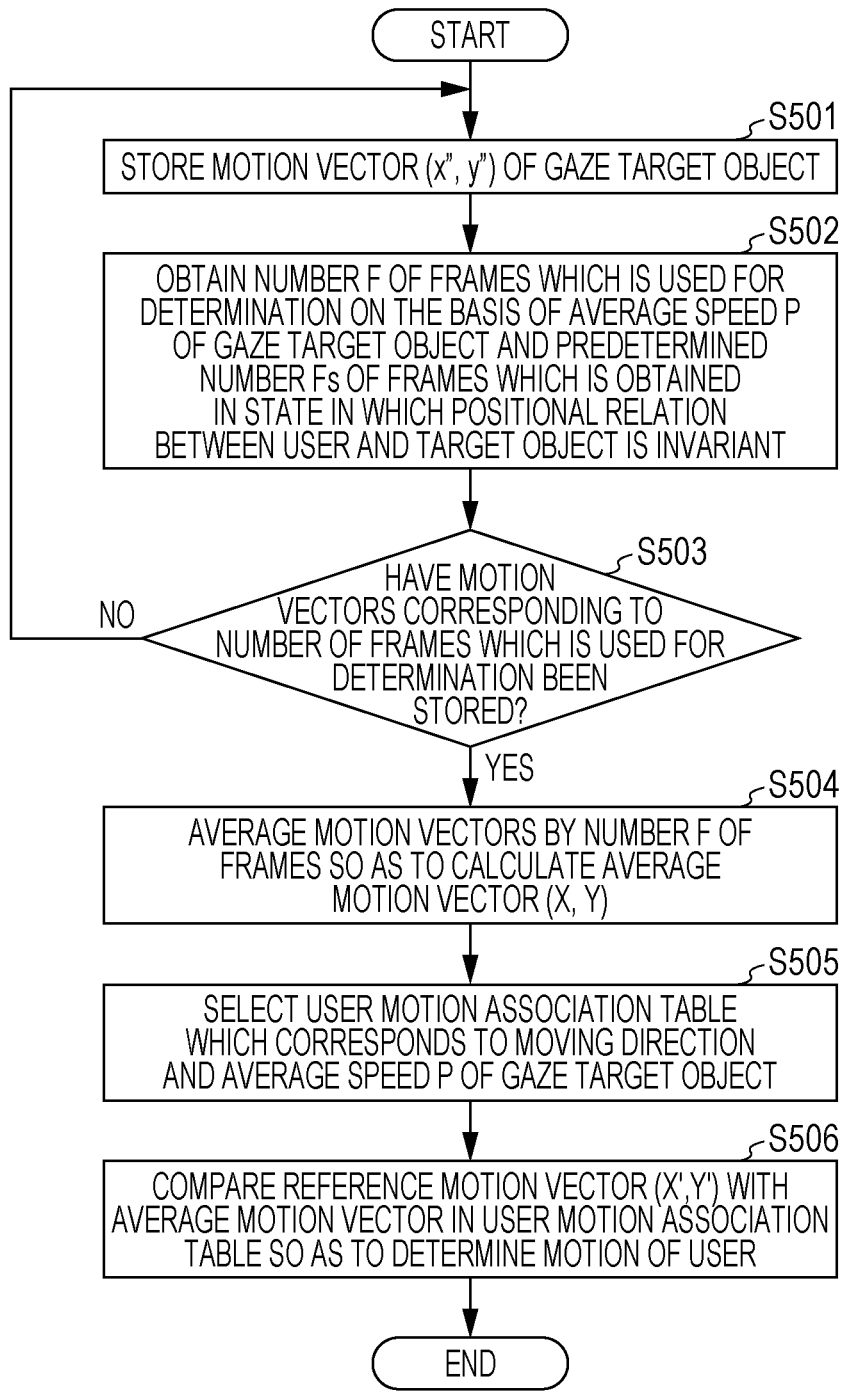
FIG. 8 is a flowchart of determination processing of a motion of a user which is performed by a motion determination unit.

FIG. 8 is a flowchart illustrating the determination processing of a motion of a user which is performed by the motion determination unit 8. The motion determination unit 8 first stores the motion vector (x'',y'') which is calculated by the motion amount calculation unit 7, of a gaze target object in the memory 14 (step S501). Then, the motion determination unit 8 obtains the number F of frames which is used for determination, by using the average speed P of the gaze target object which is calculated by the movement estimation unit 5 and the predetermined number Fs of frames (for example, 30 frames) which is obtained in a state that a positional relation between a user and the gaze target object is invariant (step S502).

As mentioned above, there is such tendency that head motion time of a case in which a user gazes at a moving object is shorter than head motion time of a case in which the user gazes at a still object, and head motion time becomes shorter as an object at which the user gazes moves in a higher speed. Accordingly, when motion vectors are averaged by the fixed number of frames irrespective of a moving speed of an object in a case in which a user gazes at the object which is moving, a gap with respect to a speed of an actual head motion is generated. Consequently, it may be difficult to accurately determine a motion of the user.

Therefore, the number F of frames which is used for determination is obtained by using the following formula in the embodiment of the present disclosure. Here, k denotes an invariable, and a case in which k=1.0 is described in this embodiment.

$$F = Fs - k \times P$$

For example, when Fs, k (invariable), and the average speed P are set as 30 frames, 1.0, and 1.0 (pixel/frame) respectively, the number F of frames which are used is 25 frames.

Then, the motion determination unit 8 determines whether or not motion vectors of the predetermined number of frames have been stored (step S503). The predetermined number of frames is the number F of frames which is obtained by the motion determination unit 8 in step S502, and is 25 frames in the above-described example.

When it is determined that motion vectors of the predetermined number of frames are stored (step S503: Yes), the motion determination unit 8 averages the stored motion vectors by the predetermined number of frames so as to obtain an average motion vector (X,Y) (step S504). When it is determined that motion vectors of the predetermined number of frames are not stored (step S503: No), the motion determination unit 8 returns the processing to step S501.

Subsequently, the motion determination unit 8 selects a user motion association table which corresponds to a moving direction and an average speed P of the gaze target object (step S505). As described above, in a case where a user moves the user's head in parallel with the moving direction of a gaze object, a motion speed is increased as a moving speed of the gaze object is increased (motion time becomes shorter). Further, it is also predictable that motion speeds are different from each other between a case in which the head is moved in the same direction as the moving direction of the gaze target object and a case in which the head is moved in an opposite direction to the moving direction of the gaze target object. Accordingly, user motion association tables which are different for every moving direction and moving speed of an object are prepared and a user motion association table which corresponds to a moving direction and an average speed P of a gaze target object is selected among the user motion association tables, in the embodiment of the present disclosure.

FIG. 9 illustrates an example of a user motion association table in the embodiment of the present disclosure. In FIG. 9, user motion association tables which are different for every moving direction of an object and every moving speed of the object are stored in the storage unit 2. In each of the user motion association tables, a user motion, a reference motion vector (X',Y'), and a tolerance range are stored in a manner to be associated with each other for every moving direction of the object. When P=15 (pixel/frame) and a moving direction of the gaze target object is left, for example, the motion determination unit 8 selects a table on the first row from the top (the moving direction of the object is left) and the second column from the left (the moving speed is 10 or more and less than 20) as a user motion association table which is used for determination processing of a user motion.

Subsequently, the motion determination unit 8 compares a reference motion vector (X',Y') in the user motion association table, which is selected by the motion determination unit 8 in step S505, with the average motion vector (X,Y) in the table so as to determine a motion of the user (step S506).

A case in which an average motion vector which is obtained in step S504 is (−13.1,2.6) when the above-mentioned table is selected in step S505 is described, for example. In this case, a vector amount is closest to a reference vector (−15,0) and is within a tolerance range (±5,±5) which is preliminarily defined as a permissible amount, so that the motion determination unit 8 determines that a user turns the user's head right. Here, a user motion, a reference motion vector, and a tolerance range may be arbitrarily set by a system administrator or the like without being limited to the above-mentioned values. Further, a user motion association table is formed by separating a moving speed of an object by every 10 pixels/frame in this embodiment, but various methods may be employed in practice within the scope of the present disclosure.

Thus, the motion determination unit 8 averages motion vectors of a user by the number of frames which corresponds to a moving speed of an object, so as to calculate an average motion vector, and determines a motion of the user by using the average motion vector and a user motion association table which corresponds to a moving direction and a moving speed of the object.

[Second Processing Flow of Motion Determination Unit 8]

Figure 10:
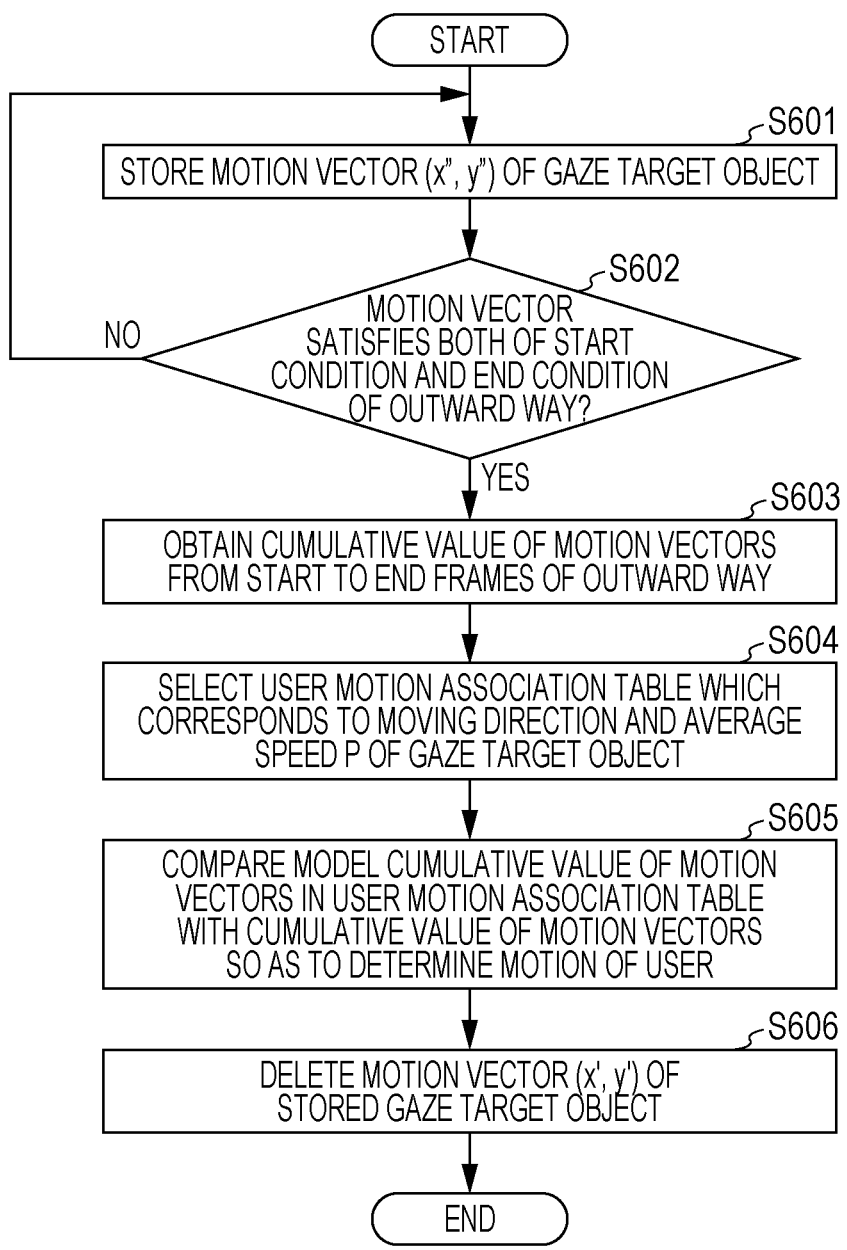
FIG. 10 is a flowchart of a second user motion determination processing which is performed by the motion determination unit.

FIG. 10 is a flowchart illustrating a second determination processing of a motion of a user which is performed by the motion determination unit 8. The motion determination unit 8 may detect a start and an end of an outward way of a user motion and determine a motion of a user by using a cumulative value or an average of motion vectors from the start to the end, as well, without calculating the predetermined number of frames corresponding to a moving speed of an object. Here, a case in which a cumulative value of motion vectors is used is described in the following description.

The motion determination unit 8 first stores a motion vector (x″,y″) of a gaze target object which is calculated by the motion amount calculation unit 7, in the memory 14 (step S601). Then, the motion determination unit 8 determines whether or not the motion vector satisfies both of a start condition and an end condition of an outward way (step S602). As described above, the motion determination unit 8 is capable of recognizing a start and an end of an outward way by a predetermined algorithm which is well-recognized. When it is determined that the motion vector does not satisfy the start condition and the end condition of the outward way (step S602: No), the motion determination unit 8 returns the processing to step S601.

When it is determined that the motion vector satisfies the start condition and the end condition of the outward way (step S602: Yes), the motion determination unit 8 calculates a cumulative value of motion vectors from a start frame to an end frame of the outward way (step S603).

Subsequently, the motion determination unit 8 selects a user motion association table which corresponds to a moving direction and an average speed P of a gaze target object (step S604). Here, it is assumed that a user motion, a model cumulative value of motion vectors, and a tolerance range are stored in each user motion association table in a manner to be associated with each other, in a case where this processing flow is applied.

The motion determination unit 8 compares a model cumulative value of motion vectors of the user motion association table, which is selected by the motion determination unit 8 in step S604, with the cumulative value of motion vectors which is calculated in step S603 in the table so as to determine a motion of a user (step S605).

Thus, a start and an end of an outward way of a head motion of a user are detected and a motion of the user is determined by using a cumulative value or an average value of motion vectors of the number of frames which are taken on the outward way, being able to more accurately determine a motion of the user. Here, not only a cumulative value or an average value of motion vectors of an outward way but also a cumulative value or an average value of motion vectors of a return way or a cumulative value or an average value of motion vectors of both of the outward way and the return way may be used for determination. However, when a cumulative value or an average value of motion vectors of both of the outward way and the return way is used, a cumulative value or an average value is obtained by using absolute values of motion vectors.

Embodiment 2

Figure 11A:
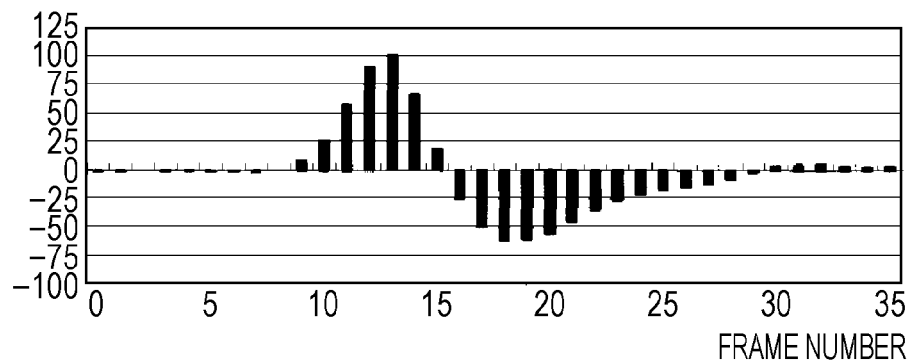
FIGS. 11A to 11C illustrate examples of temporal change patterns of a motion vector of a user in moving speeds of different objects.
Figure 11B:
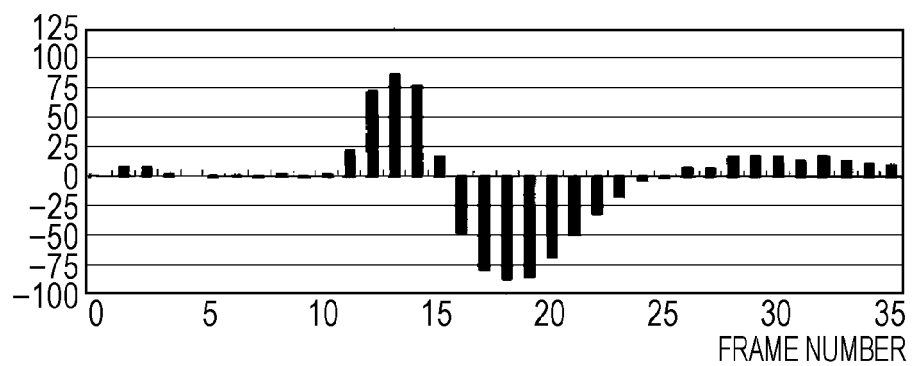
Figure 11C:
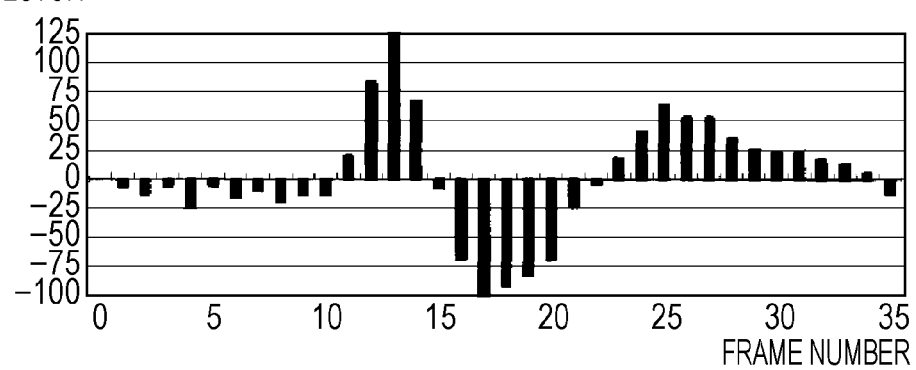

Further, the motion amount calculation unit 7 may generate a temporal change pattern of a motion vector of a user by accumulating motion vectors as many as the number of frames and the motion determination unit 8 may determine a motion of a user by associating the temporal change pattern with any of model temporal change patterns which are obtained by modeling motions of the user, as well. FIGS. 11A to 11C illustrate examples of model temporal change patterns of a motion vector of a user in different moving speeds of an object. FIG. 11A illustrates a model temporal change pattern of a motion vector in a motion of a head of a user in a case where an object stands, FIG. 11B illustrates a model temporal change pattern of a motion vector in a motion of a head of a user in a case where an object is moving at a low speed, and FIG. 11C illustrates a model temporal change pattern of a motion vector in a motion of a head of a user in a case where an object is moving at a high speed.

In FIG. 11A, frame numbers 9 to 15 (total 7 frames) correspond to an outward way, and frame numbers 16 to 28 (total 13 frames) correspond to a return way. Further, in FIG. 11B, frame numbers 11 to 15 (total 5 frames) correspond to an outward way, and frame numbers 16 to 23 (total 8 frames) correspond to a return way. In a similar manner, in FIG. 11C, frame numbers 11 to 14 (total 4 frames) correspond to an outward way, and frame numbers 15 to 21 (total 7 frames) correspond to a return way. Thus, a model temporal change pattern is set such that motion time of a head motion is shorter and a motion vector of the head motion is larger as a moving speed of an object at which a user gazes is higher.

In this embodiment, a model temporal change pattern is preliminarily formed for every moving direction and moving speed of an object and is stored in the storage unit 2. The motion determination unit 8 selects a model temporal change pattern which corresponds to a moving direction and a moving speed of an object so as to determine a motion of the user in a method similar to the earlier application (Japanese Patent Application No. 2011-268378). Further, the motion determination unit 8 may modify the model temporal change pattern depending on an actual motion of a user. Specifically, when a model temporal change pattern is associated with a temporal change pattern of a motion vector of a user, the model temporal change pattern is updated with a temporal change pattern of a motion vector of the user, enabling a use of a model temporal change pattern which is closer to a motion of the user for motion determination.

Further, when change, which corresponds to a moving speed of an object, of a temporal change pattern of a motion vector of a user is predictable, a model temporal change pattern in a moving speed (for example, when the object stands) of a certain object may be modified in accordance with the moving speed so as to generate a model temporal change pattern for every moving speed. Further, when a model temporal change pattern and a temporal change pattern of a motion vector of a user are collated with each other, a part which is used for collation may be limited, such as collation of only an outward way and collation of an outward way and a return way.

Here, for comparison between a model temporal change pattern and a temporal change pattern of a motion vector, not only calculation of a degree of similarity which is disclosed in the earlier application (Japanese Patent Application No. 2011-268378) but also a method in which feature amounts of both of the temporal change patterns are extracted and compared, a method in which both of the temporal change patterns are quantified by a hush function or the like so as to match the values, and the like may be employed.

The description in which a moving direction of an object is a horizontal or vertical direction has been provided thus far, but the embodiment is applicable to a case in which an object is moving in an oblique direction, as well. In this case, a motion vector of an object which is acquired by the motion estimation unit 5 is expressed by a component which is parallel with a turning direction of a head and a component which is orthogonal to the turning direction of the head, being able to handle subsequent cases in the same manner as a case in which the object moves horizontally or vertically.

As described above, according to the embodiments of the present disclosure, it is possible to detect a motion of a user in a case where the user gazes at a moving object.

FIG. 12 is a configuration diagram of a HMD 300 which includes the image processing device 1 according to one embodiment. In the HMD 300, the imaging device 100 may be disposed on a center between both eyes by using a glasses-like casing so that the user easily specifies a gaze target object. Further, a plurality of imaging devices 100, not depicted, may be disposed so as to use a stereo image. As the display device 200, a transparent display may be used so as to enable a user to recognize the outside world.

Further, respective constituent elements of respective devices which are depicted do not necessarily have to be physically configured as depicted. That is, specific configurations of dispersion/integration of respective devices are not limited to the depicted configurations, and all of or part of the configurations may be configured to be functionally or physically dispersed/integrated in an arbitrary unit depending on a load or a use status of each of the elements. Further, various types of processing which have been described in the above-described embodiments may be realized by executing a prepared program by a computer such as a personal computer and a work station.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device configured to execute a process in accordance with a type of gesture performed by a head of a user equipped with a camera, the image processing device, comprising:
a memory configured to store:
feature point information to separately identify at least two objects,
user motion association information in which the type of gesture and a combination of a moving direction of an object, a moving speed of the object, and a motion vector corresponding to the object are associated with each other, and
display information indicating a relationship between the type of gesture and collateral information indicating detail information of a plurality of objects existing around the user; and
a processor coupled to the memory and configured to:
extract a plurality of feature points positioned within a predetermined peripheral region in an image from a plurality of images captured by the user wearing the camera at different timings,
specify an object corresponding to the plurality of feature points by referring to the feature point information,
determine whether the object moving from the predetermined peripheral region to a central region positioned in an inside of the predetermined peripheral region and a coordinate variation of the object after reaching the central region remains within a predetermined range,
determine that the object is a target object indicating a gaze target of the user, in response to determining that the object is moving from the predetermined peripheral region to the central region and that the coordinate variation of the object remains within the predetermined range,
calculate a combination of a moving direction of the target object, a moving speed of the target object, and a motion vector corresponding to the target object, by using a coordinate variation of the target object before reaching the central region, on the plurality of images,
extract the type of gesture corresponding to the calculated combination from the user motion association information,
extract the collateral information of the target object corresponding to the extracted type of gesture from the display information, and
display the extracted collateral information in a manner to be superposed on the target object.

2. The image processing device according to claim 1, further comprising a glasses-like casing,
wherein the memory, the processor and the camera are disposed over the glasses-like casing.

3. The image processing device according to claim 2,
wherein the camera is disposed on a center between both eyes when wearing the glasses-like casing.

4. An image processing method executed by an image processing device, the image processing method comprising:
storing feature point information to separately identify at least two objects;
storing user motion association information in which a type of gesture performed by a head of a user and a combination of a moving direction of an object, a moving speed of the object, and a motion vector corresponding to the object are associated with each other;

storing display information indicating a relationship between the type of gesture and collateral information indicating detail information of a plurality of objects existing around the user;

extracting a plurality of feature points positioned within a predetermined peripheral region in an image from a plurality of images captured by the user wearing a camera at different timings;

specifying an object corresponding to the plurality of feature points by referring to the feature point information;

determining whether the object moving from the predetermined peripheral region to a central region positioned in an inside of the predetermined peripheral region and a coordinate variation of the object after reaching the central region remains within a predetermined range;

determining that the object is a target object indicating a gaze target of the user, in response to determining that the object is moving from the predetermined peripheral region to the central region and that the coordinate variation of the object remains within the predetermined range;

calculating a combination of a moving direction of the target object, a moving speed of the target object, and a motion vector corresponding to the target object, by using a coordinate variation of the target object before reaching the central region, on the plurality of images;

extracting the type of gesture corresponding to the calculated combination from the user motion association information;

extracting the collateral information of the target object corresponding to the extracted type of gesture from the display information; and displaying the extracted collateral information in a manner to be superposed on the target object.

5. The image processing method according to claim 4, wherein the calculating of the motion vector of the calculated combination includes:

calculating a plurality of variation amounts of one or more feature points for each of acquiring intervals of the plurality of images;

obtaining a plurality of averaged variation amounts by averaging the plurality of variation amounts which are calculated for each of the acquiring intervals;

calculating a number of frames, based on an average speed of the target object and a predetermined number of frames obtained when a positional relation between the user and the target object is invariant;

calculating the motion vector by averaging the plurality of averaged variation amounts by the calculated number of frames.

6. The image processing method according to claim 5, wherein the calculating of the number of frames includes:

calculating a product of a constant value and the average speed of the target object; and calculating a difference between the predetermined number of frames and the calculated product.

7. The image processing method according to claim 5, further comprising:

determining whether the plurality of averaged variation amounts satisfies both of a start condition and an end condition of an outward way of motion of the user;

obtaining a cumulative value of the plurality of averaged variation amounts from a start image to an end image of the outward way among the plurality of acquired images, and wherein the specifying a head motion of the user corresponding to the calculated combination includes specifying the head motion of the user based on the cumulative value and the user motion information.

8. The image processing method according to claim 5, further comprising:

setting an upper limit of the plurality of variation amounts; and determining whether the plurality of variation amounts is valid based on the upper limit.

9. The image processing method according to claim 5, wherein parts within a predetermined length from upper and lower ends of each of the plurality of images are set as the predetermined peripheral region when the plurality of feature points are moving vertically; and parts within a predetermined length from the right and left ends of each of the plurality of images are set as the predetermined peripheral region when an object is moving horizontally.

10. The image processing method according to claim 5, further comprising determining that the coordinate variation of the object after reaching the central region remains within the predetermined range, when a coordinate of the object remains in the central region for a predetermined number of frames continuingly after the coordinate of the object enters the central region.

11. The image processing method according to claim 4, wherein the combination stored in the user motion association information further includes a tolerance range of the motion vector corresponding to the object, and the extracting of the type of the gesture includes acquiring, from the user motion association information, a motion vector similar to the calculated motion vector, based on the tolerance range of the motion vector corresponding to the object.

12. The image processing method according to claim 4, wherein the central region and the predetermined peripheral region are separated by an intermediate region within the image.

13. The image processing method according to claim 4, wherein the user motion association information are tables which are different for every moving direction of an object and every moving speed of the object.

* * * * *